(12) United States Patent
Lin et al.

(10) Patent No.: US 7,310,247 B1
(45) Date of Patent: Dec. 18, 2007

(54) METHOD FOR CONTROLLING TRANSFORMER EXCITATION CYCLES AND CIRCUIT FOR CONTROLLING THE SAME

(75) Inventors: Kuo-Fan Lin, Taoyuan Hsien (TW); Chien-Li Tsai, Taoyuan Hsien (TW)

(73) Assignee: SPI Electronic Co., Ltd., Taoyuan Hsien (TW)

( * ) Notice: Subject to any disclaimer, the term of this patent is extended or adjusted under 35 U.S.C. 154(b) by 0 days.

(21) Appl. No.: 11/605,234

(22) Filed: Nov. 29, 2006

(51) Int. Cl.
*H02M 3/22* (2006.01)
*H02M 3/335* (2006.01)

(52) U.S. Cl. .................. 363/21.11; 363/97; 363/131

(58) Field of Classification Search .......... 363/15, 363/16, 20, 21.01, 21.04, 21.06, 21.09, 21.1, 363/21.11, 21.18, 97, 131
See application file for complete search history.

(56) References Cited

U.S. PATENT DOCUMENTS

| 6,392,906 | B2* | 5/2002 | L'Hermite et al. .......... 363/97 |
| 6,535,400 | B2* | 3/2003 | Bridge .................... 363/21.06 |
| 6,862,197 | B2* | 3/2005 | Eriksson ................. 363/21.04 |

* cited by examiner

*Primary Examiner*—Gary L Laxton
(74) *Attorney, Agent, or Firm*—Birch, Stewart, Kolasch & Birch, LLP

(57) ABSTRACT

The present invention discloses a method for controlling transformer excitation cycles and a circuit for controlling the same, wherein the excitation cycle and the demagnetization cycle, which determine the rise and fall of the excitation current, are modified to prevent the coil from being saturated. In the present invention, a sense current is acquired from the excitation current of the transformer coil, and a demagnetization reference value is set. The sense current is used to determine whether the excitation current is lowered to the demagnetization reference value in the demagnetization cycle. A cycle modifying circuit is used to modify the duty cycle signal output by a pulse control unit until the excitation current is lowered to a preset level.

10 Claims, 4 Drawing Sheets

METHOD FOR CONTROLLING TRANSFORMER EXCITATION CYCLES AND CIRCUIT FOR CONTROLLING THE SAME

FIELD OF THE INVENTION

The present invention relates to a method for controlling transformer excitation cycles and a circuit for controlling the same, wherein the excitation current, the excitation cycle and the demagnetization cycle of a coil is modified to prevent the excitation current from reaching the saturated excitation value lest the coil be saturated.

BACKGROUND OF THE INVENTION

Electric power conversion devices, such as transformers and power supplies, are indispensable products in modern society. Various types of electric power conversion devices are widely used in daily living. However, the working principle thereof is no more than to modulate voltage and rectify current. The fabrication of power conversion devices has been a mature technology, but they can still advance in cooperation with semiconductor technologies.

Inside a power supply, there is a transformer to convert commercial power into stable direct current (DC) power. The transformer utilizes the electromagnetic induction inside two coils to convert electric energy. A coil is equivalent to an inductor in the circuit theory. When a current flows through the coil of a transformer, an induced current is generated. According to the Lenz's law, the induced current flowing through the coil will generate an extra magnetic field, and an opposite induced magnetic field is then generated to resist the extra magnetic field. Thus, the change of the current in a coil will generate an opposite induced current, i.e. the coil of an inductor is apt to resist the change of the current in the coil. In other words, the current in a coil has inertia to resist change. The abovementioned characteristic of coils results in some problems of the conventional transformers. Refer to FIG. 1 a block diagram schematically showing the circuit of a conventional power supply and FIG. 2 a diagram schematically showing the waveforms of a conventional power supply. The conventional power supply commonly has a pulse control unit 3 to control a switch unit 4; the conduction cycle of the switch unit 4 is used to regulate the current flowing through the coil of the primary side of a transformer and make the output terminals Vout of the secondary side of the transformer able to provide a stable voltage for loads. A voltage feedback unit 5 provides a feedback signal to the pulse control unit 3. When the load increases, the fallen output voltage will make the pulse control unit 3 prolong the conduction cycle of the switch unit 4 to increase the current of the primary side of the transformer so that the secondary side can provide more electric energy. Thereby, when there is a heavy load, the balanced current of the coil is boosted. In addition to the inertia of keeping current, the current-rising rate is greater than the current-falling rate in the coil; therefore, the average current is hard to fall to the original value. If the load constantly varies for a period of time, the suddenly increasing load will exaggerate the excitation current Im to exceed the saturated excitation value 7 of the coil. Thus, the transformer is saturated, and a surge current 8 is generated. The IC chip used by the conventional pulse control unit 3 usually has an over-current protection function. When the surge current 8 appears, the pulse control unit 3 will turn off the switch unit 4 to eliminate the surge current 8. However, via the mutual induction between the coils of the transformer, the sudden appearance of the surge current 8 will apply a very great surge voltage 81 to the switch unit 4, which may seriously damage the power supply Refer to FIG. 1 and FIG. 2 again. I_Lo represents the current of the output terminals of the secondary side. The falling of I_LO signifies that the load decreases. When I_Lo falls to below zero, it signifies that the redundant energy is being recycled. The rising of I_Lo signifies that the load increases. Vds represents the voltage difference between two terminals of the SW1 of the switch unit 4. The excitation current Im is the current flowing through the primary coil. The duty cycle signal Va is the output of the pulse control unit 3. The pulse control unit 3 outputs the duty signal Va to control the conductive activities between the switches SW1 and SW2. Thus, the excitation current Im has an excitation cycle wherein Im increases and a demagnetization cycle wherein Im decreases. When the load constantly changes, the DC level of the excitation current Im will also constantly uprise because of the above-mentioned characteristic of the coil. Further, the resistance to the change of the coil's current results in that the excitation current falls very slowly. Besides, the conventional power supply does not have the mechanism to make the excitation current Im fall to the original level. Thus, the excitation current Im will approach the saturation state in the cycles wherein the load varies more obviously, and the elements of the power supply is likely to be damaged by the surge voltage 81.

SUMMARY OF THE INVENTION

The primary objective of the present invention is to provide a method to prevent the excitation current from rising to the saturation value, wherein the cycle of the excitation current is controlled to prevent the maximum excitation current from reaching the saturation value of the transformer coil.

The present invention proposes a method for controlling transformer excitation cycles and a circuit for controlling the same, wherein the excitation cycle and the demagnetization cycle, which determine the rise and fall of the excitation current, are modified to prevent the coil from being saturated. The control method of the present invention comprises a means of setting the duty cycle of a transformer, a means of detecting the modified excitation cycle of the transformer and a means of modifying the demagnetization cycle of the transformer. When the load increases, the pulse control unit of the power supply modulates the original excitation cycle to obtain a modified excitation cycle having a longer length of time to meet the requirement of the load. Via the means of the method of the present invention, a modified demagnetization cycle succeeding to the modified excitation cycle is generated, and the modified demagnetization cycle will persist until the excitation current is lowered to a preset level to completely avoid the coil saturation resulting from too high an excitation current.

The control circuit of the present invention comprises a current detection circuit and a cycle modification circuit. The current detection circuit acquires a sense current from the excitation current and determines whether the excitation current is lowered to a preset level in the demagnetization cycle according to the sense current. The cycle modification circuit modifies the duty cycle signal of a pulse control unit until the excitation current is lowered to the preset level, and a modified demagnetization cycle is thus generated.

DETAILED DESCRIPTION OF THE PREFERRED EMBODIMENTS

Figure 1:
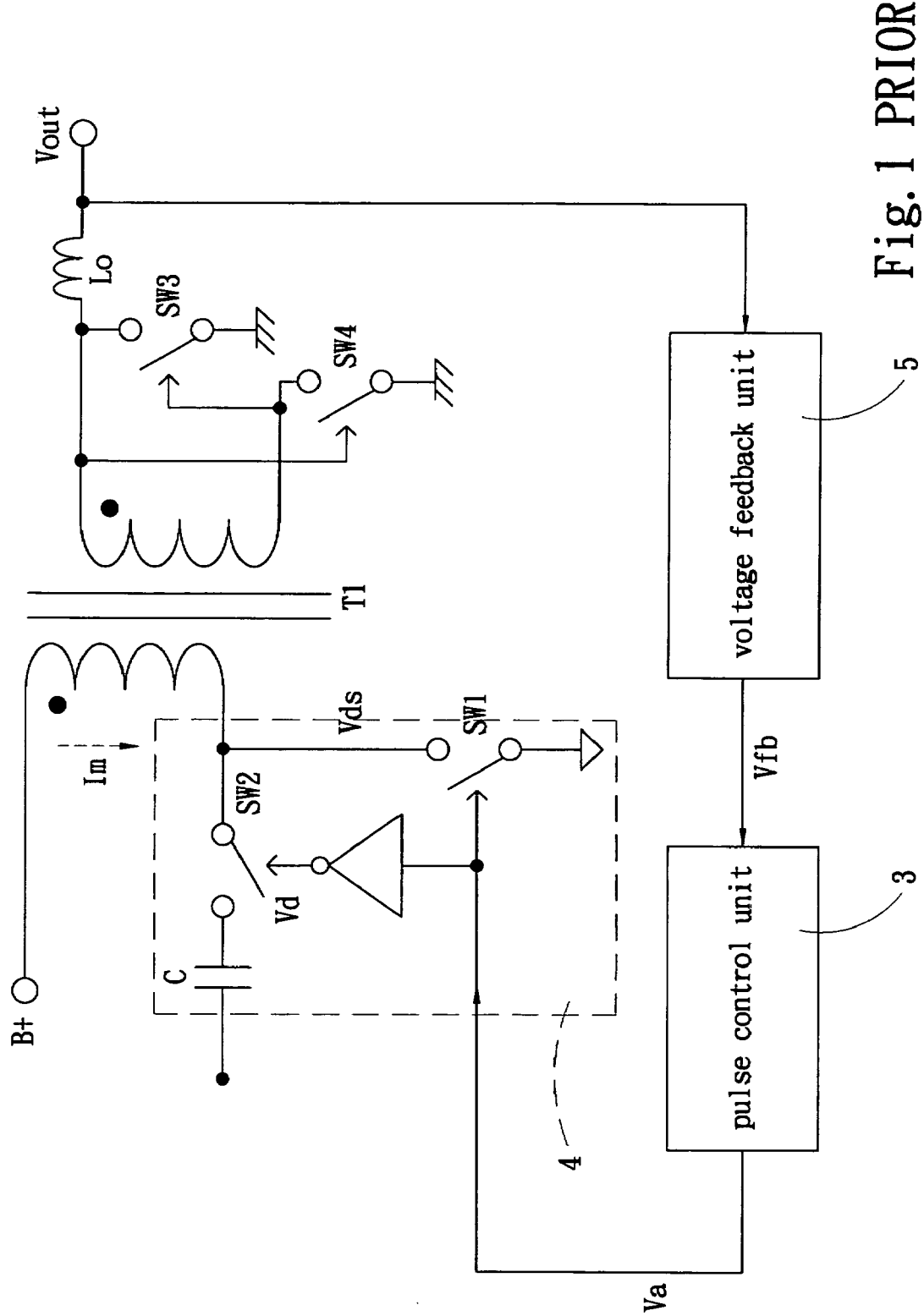
FIG. 1 is a block diagram schematically showing the circuit of a conventional power supply.
Figure 2:
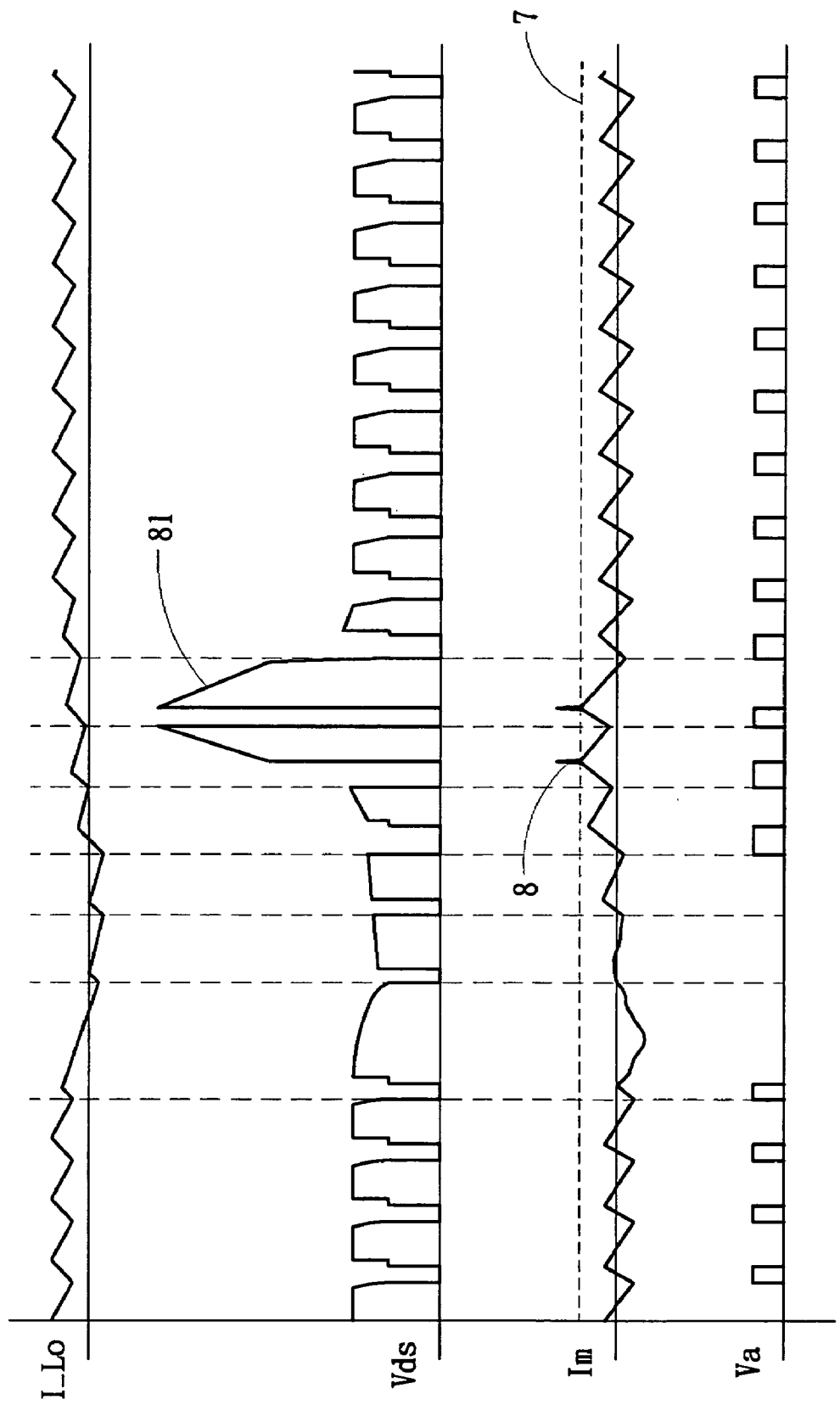
FIG. 2 is a diagram schematically showing the waveforms of a conventional power supply.
Figure 3:
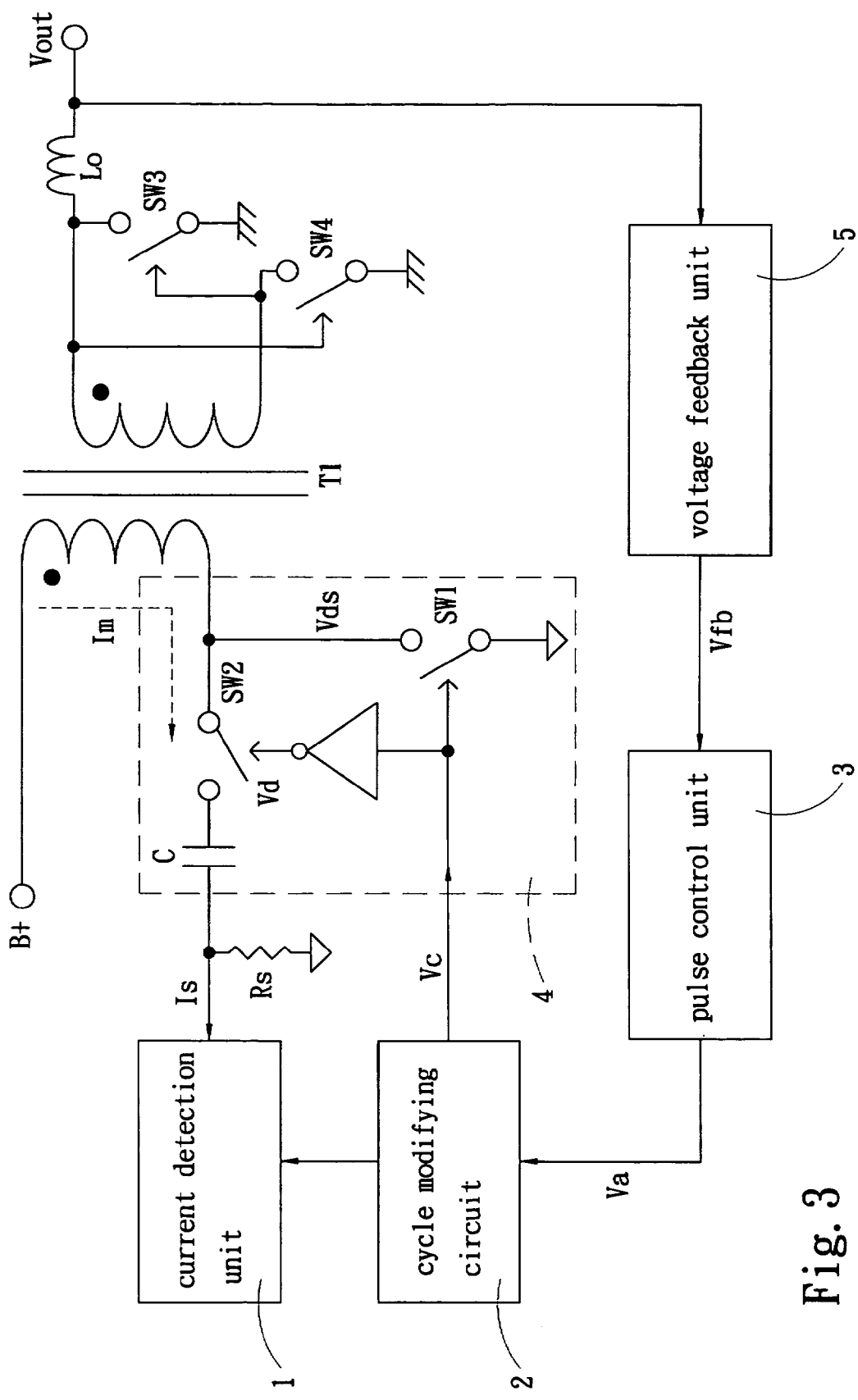
FIG. 3 is a block diagram schematically showing the circuit according to the present invention.
Figure 4:
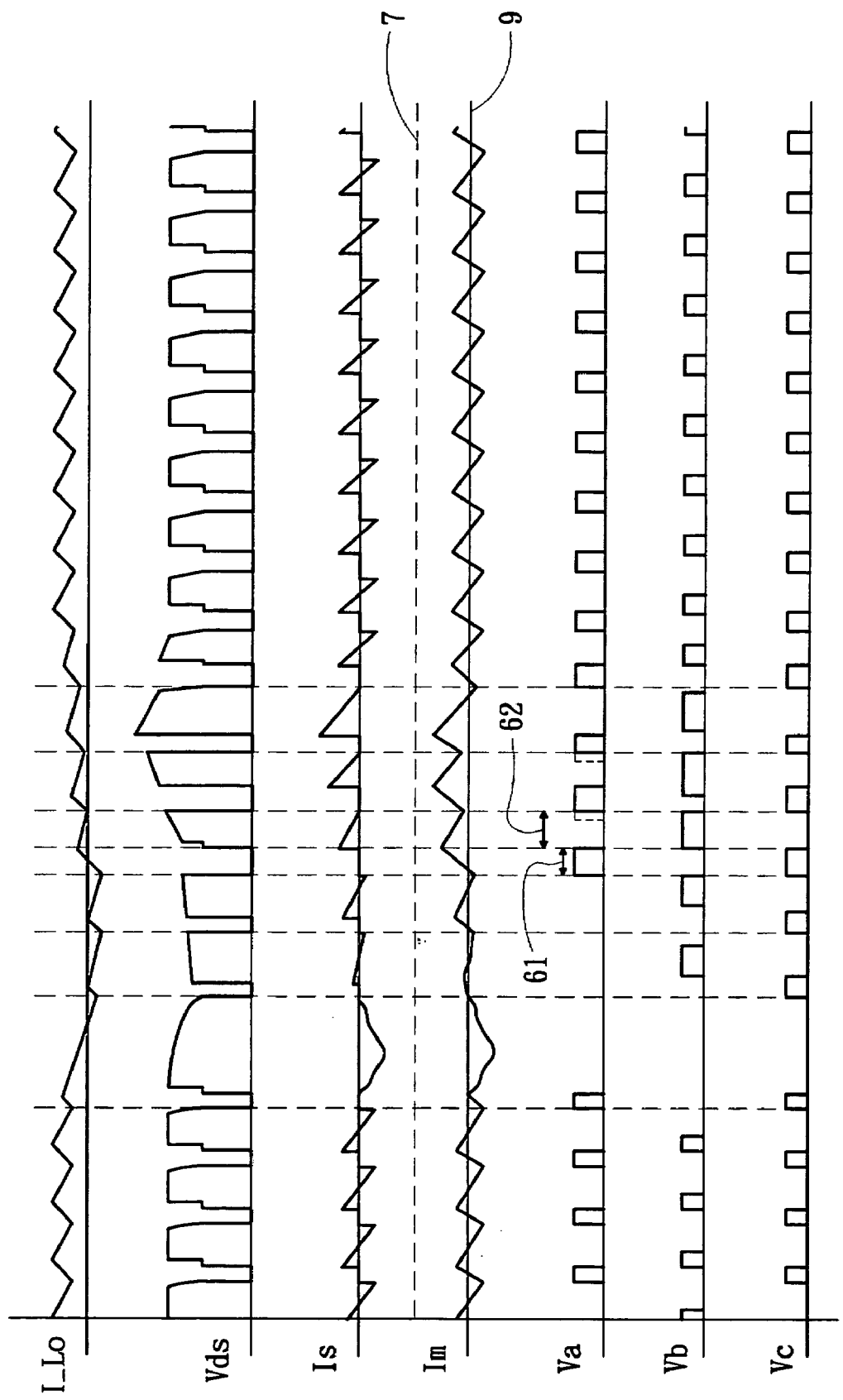
FIG. 4 is a diagram schematically showing the waveforms according to the present invention.

Refer to FIG. 3 a block diagram schematically showing the circuit according to the present invention and FIG. 4 a diagram schematically showing the waveforms according to the present invention. The method for controlling transformer excitation cycles of the present invention comprises a means of setting the duty cycle of a transformer, a means of detecting the modified excitation cycle of the transformer and a means of modifying the demagnetization cycle of the transformer. In the means of setting the duty cycle of a transformer, the front semiperiod of each duty cycle is defined to be an excitation cycle, wherein the excitation current Im increases, as shown in FIG. 4, and the rear semiperiod of each duty cycle is defined to be a demagnetization cycle, wherein the excitation current Im decreases. In the means of setting the duty cycle of a transformer, all the duty cycles have an identical duty width; all the excitation cycles have an identical change of the excitation current Im; and all the demagnetization cycles also have an identical change of the excitation current Im. When the load of the transformer increases, a pulse control unit 3 modulates the duty cycle and prolongs the original excitation cycle to generate a modified excitation cycle 61, and the rise of the excitation current Im thus increases. Further, the demagnetization cycle is shortened, and the excitation current Im is hard to lower to the original level. Thus, in the means of detecting the modified excitation cycle 61 of the transformer, the variation of the power driving the load behind the transformer is used to obtain the modified excitation cycle 61 and the maximum current of the modified excitation cycle 61. In the means of modifying the demagnetization cycle of the transformer, a saturated excitation value 7 and a demagnetization reference value 9 are set. The demagnetization reference value 9 may be equal to 0. Alternatively, the saturated excitation value 7 is estimated in designing the transformer, and the demagnetization reference value 9 is set under the condition that the maximum value of the excitation current Im is lower than the saturated excitation value 7. When the load increases and the pulse control unit 3 generates a modified excitation cycle 61, the maximum current of the modified excitation cycle 61 obtained in the preceding step and the demagnetization reference value 9 are use to generate a modified demagnetization cycle 62 under the identical change of the excitation current Im of the normal demagnetization cycle. The modified demagnetization cycle 62 is used to enforce that the transformer cannot start the next excitation cycle unless the minimum current of the modified demagnetization cycle 62 is equal to or less than the demagnetization reference value 9. Thus, the maximum current of any one modified excitation cycle 61 will not exceed the saturated excitation value 7, and the transformer can always operate normally.

Refer to FIG. 3 and FIG. 4. The circuit for controlling transformer excitation cycles of the present invention comprises a current detection unit 1 and a cycle modification circuit 2. The pulse control unit 3 sends a duty cycle signal Va to the cycle modification circuit 2, and the cycle modification circuit 2 modifies the duty cycle signal Va to output a signal Vc to control a switch unit 4 and then control the lengths of the excitation cycle and the demagnetization cycle. The switch unit 4 further comprises a first switch SW1 and a second switch SW2 and is used to control the conductive state between a power source and the transformer coil and then control the excitation current Im. The signals Vc output by the cycle modification circuit 2 include a high level signal and a low level signal. When the signal Vc output by the cycle modification circuit 2 is the high level signal, the first switch SW1 is turned on, and the second switch SW2 is turned off. When the signal Vc output by the cycle modification circuit 2 is the low level signal, the first switch SW1 is turned off, and the second switch SW2 is turned on. The turn-on timings of the first switch SW1 and the second switch SW2 are separated. The excitation cycle and the demagnetization cycle respectively correspond to the turn-on of the first switch SW1 and the second switch SW2. The current detection unit 1 controls the modifying operation of the cycle modification circuit 2. The current detection unit 1 utilizes a shunt loop to obtain a sense current Is from the excitation current Im and determines whether to enter into the demagnetization cycle according to the sense current Is. The current detection unit 1 has a first duty state wherein the demagnetization cycle starts and a second duty state wherein the minimum current of the demagnetization cycle has reached the demagnetization reference value 9. Under the initial duty state, when the excitation current Im has been lower than the demagnetization reference value 9 in the demagnetization cycle, the current detection unit 1 returns to the second duty state; thus, the cycle modification circuit 2 will not modify the output of the pulse control unit 3, and the signal Vc output by the cycle modification circuit 2 is the same as the duty cycle signal Va output by the pulse control unit 3. When the load suddenly increases, a voltage feedback unit 5 sends a signal to the pulse control unit 3, and the pulse control unit 3 extends the original excitation cycle and generates a modified excitation cycle 61. Thus, the longer excitation cycle increases the excitation current Im to near the saturated excitation value 7. When the excitation current Im of the demagnetization cycle, which succeeds to the modified excitation cycle 61, flows through the second switch SW2, and when the current detection unit 1 detects that the sense current Is is greater than the demagnetization reference value 9 and enters into the first duty state, the current detection unit 1 persists in sending out a modifying signal Vb of the high level signal to instruct the cycle modification circuit 2 to modify the duty cycle signal Va output by the pulse control unit 3 (the modified regions are the dotted-line blocks shown in FIG. 4) to prolong the demagnetization cycle until the sense current Is reaches the demagnetization reference value 9. Then, the current detection unit 1 enters into the second duty state and makes the cycle modification circuit 2 stop modifying the duty cycle signal Va output by the pulse control unit 3, and a modified demagnetization cycle 62, which succeeds to the previous modified excitation cycle 61, is thus formed. Thereby, the modified demagnetization cycle 62 will follows the modified excitation cycle 61 generated by the pulse control unit 3, and the excitation current Im, which increases in the modified excitation cycle 61, will be lowered to below the demagnetization reference value 9 in the modified demagnetization cycle 62 lest the coil of the transformer enter into the saturation state.

Although the present invention has been exemplified with the preferred embodiments above, it is not intended to limit the scope of the present invention. In the means of modifying the demagnetization cycle of the transformer, the duty width of the next excitation cycle succeeding to the current modified demagnetization cycle 62 may be equal to that of the normal excitation cycle; otherwise, a signal may be sent to the cycle modifying controller to modify the ratio of the lengths of the excitation cycle and the demagnetization cycle and generate a modified excitation cycle; otherwise, an element may be used to shield the duty cycle signal Va before the excitation current Im is lowered to below the demagnetization reference value 9; otherwise, the duty cycle signal Va may be guided to another loop before the minimum current of the demagnetization cycle reaches the demagnetization reference value 9 so that the duty cycle signal Va cannot control the switch unit 4. Besides, the turn-on voltage of a switch element may be used to set a reference potential value, and the current of the demagnetization reference value 9 is set according to the reference potential value. Any modification and variation made by the person skilled in the art according to the spirit of the present invention is to be also included within the scope of the present invention, which is dependent on the claims stated below.

Summarily, in comparison with the conventional technology, the present invention achieves the abovementioned improvements and possesses novelty and non-obviousness and thus meets the conditions for a patent. Thus, the Inventor files the present invention for a patent. It is to be greatly appreciated that the patent of the present invention be approved fast.

What is claimed is:

1. A method for controlling transformer excitation cycles, comprising:
   a means of setting a duty cycle of a transformer: defining the front semiperiod of each duty cycle to be an excitation cycle and the rear semiperiod of each duty cycle to be a demagnetization cycle; making all said duty cycles have an identical duty width; making all said excitation cycles have an identical change of excitation current; and making all said demagnetization cycles have an identical change of excitation current;
   a means of detecting a modified excitation cycle of said transformer: obtaining said modified excitation cycle and the maximum current of said modified excitation cycle according to the variation of the power driving the load behind said transformer; and
   a means of modifying said demagnetization cycle of said transformer: setting a saturated excitation value and a demagnetization reference value of said transformer with said demagnetization reference value used to enforce that said transformer cannot start said excitation cycle of the next duty cycle unless the minimum current of said demagnetization cycle is equal to or less than said demagnetization reference value; and using the maximum current of said modified excitation cycle obtained in the preceding step and said demagnetization reference value to generate a modified demagnetization cycle under the identical change of said excitation current of a normal demagnetization cycle,
   wherein the maximum current of any one said modified excitation cycle will not exceed said saturated excitation value, and said transformer can always operate normally.

2. The method for controlling transformer excitation cycles according to claim 1, wherein the duty width of the next said excitation cycle succeeding to said modified demagnetization cycle is the same as that of a normal excitation cycle.

3. The method for controlling transformer excitation cycles according to claim 1, wherein the next said excitation cycle succeeding to said modified demagnetization cycle is one said modified excitation cycle; the means of modifying said excitation cycle is to generate a signal to a duty cycle controller of said transformer and adjust the ratio of the lengths of said excitation cycle and said demagnetization cycle of the next said duty cycle.

4. The method for controlling transformer excitation cycles according to claim 1, wherein the next said excitation cycle succeeding to said modified demagnetization cycle is one said modified excitation cycle; the means of modifying said excitation cycle is to block a duty cycle signal of the next said duty cycle in the path via which a duty cycle controller sends said duty cycle signal until the minimum current of said demagnetization cycle reaches said demagnetization reference value.

5. The method for controlling transformer excitation cycles according to claim 1, wherein the next said excitation cycle succeeding to said modified demagnetization cycle is one said modified excitation cycle; the means of modifying said excitation cycle is to use a loop to make the minimum current of said demagnetization cycle free from the influences of other currents until the minimum current of said demagnetization cycle reaches said demagnetization reference value.

6. The method for controlling transformer excitation cycles according to claim 1, wherein a circuit for controlling transformer excitation cycles is used to implement said method and is applied to a driver circuit of the transformer; said driver circuit comprises a power source, a pulse control unit and a switch unit; said pulse control unit and said switch unit control the output of said power source to provide current for said transformer so that electric energy can be transformed from the coil at one side of said transformer to the coil at the other side of said transformer; said circuit for controlling transformer excitation cycles can prevent said transformer from a saturation state and comprises:
   a current detection unit setting said demagnetization reference value and determining whether said transformer has entered into said demagnetization cycle and whether the minimum current of said demagnetization cycle has reached said demagnetization reference value and having a first duty state that said demagnetization cycle starts and a second duty state that the minimum current of said demagnetization cycle has reached said demagnetization reference value, wherein a shunt loop is arranged in the path via which said excitation current flows to acquired a decay signal to determine whether said transformer has entered into said demagnetization cycle and whether the minimum current of said demagnetization cycle is greater than said demagnetization reference value; and
   a cycle modifying circuit controlled by said current detection unit, wherein said duty cycle signal for controlling said transformer passes through said cycle modifying circuit; when said current detection unit enters into said first duty state that said demagnetization cycle starts, said cycle modifying circuit makes said transformer stay in said demagnetization cycle; until the minimum current of said demagnetization cycle has reached said demagnetization reference value, said current detection unit enters into said second duty state, and said cycle modifying circuit makes the rest of said duty cycle signal transferred to said transformer.

7. The method for controlling transformer excitation cycles according to claim 6, wherein a reference potential value is selected for setting said demagnetization reference value; the current of said transformer flows through a resistor and is transformed into a voltage difference by said resistor, and said voltage difference is compared with said reference potential value.

8. The method for controlling transformer excitation cycles according to claim 7, wherein a turn-on voltage level of a switch is set to be said reference potential value, and said reference potential value is converted into said demagnetization reference value.

9. The method for controlling transformer excitation cycles according to claim 6, wherein said cycle modifying circuit uses a switch to block the signal of the next said excitation cycle until the minimum current of said demagnetization cycle reaches said demagnetization reference value.

10. The method for controlling transformer excitation cycles according to claim 6, wherein said cycle modifying circuit guides the signal of said excitation cycle to another loop when the minimum current of said demagnetization cycle has not reaches said demagnetization reference value yet.

* * * * *